United States Patent Office 3,418,421
Patented Dec. 24, 1968

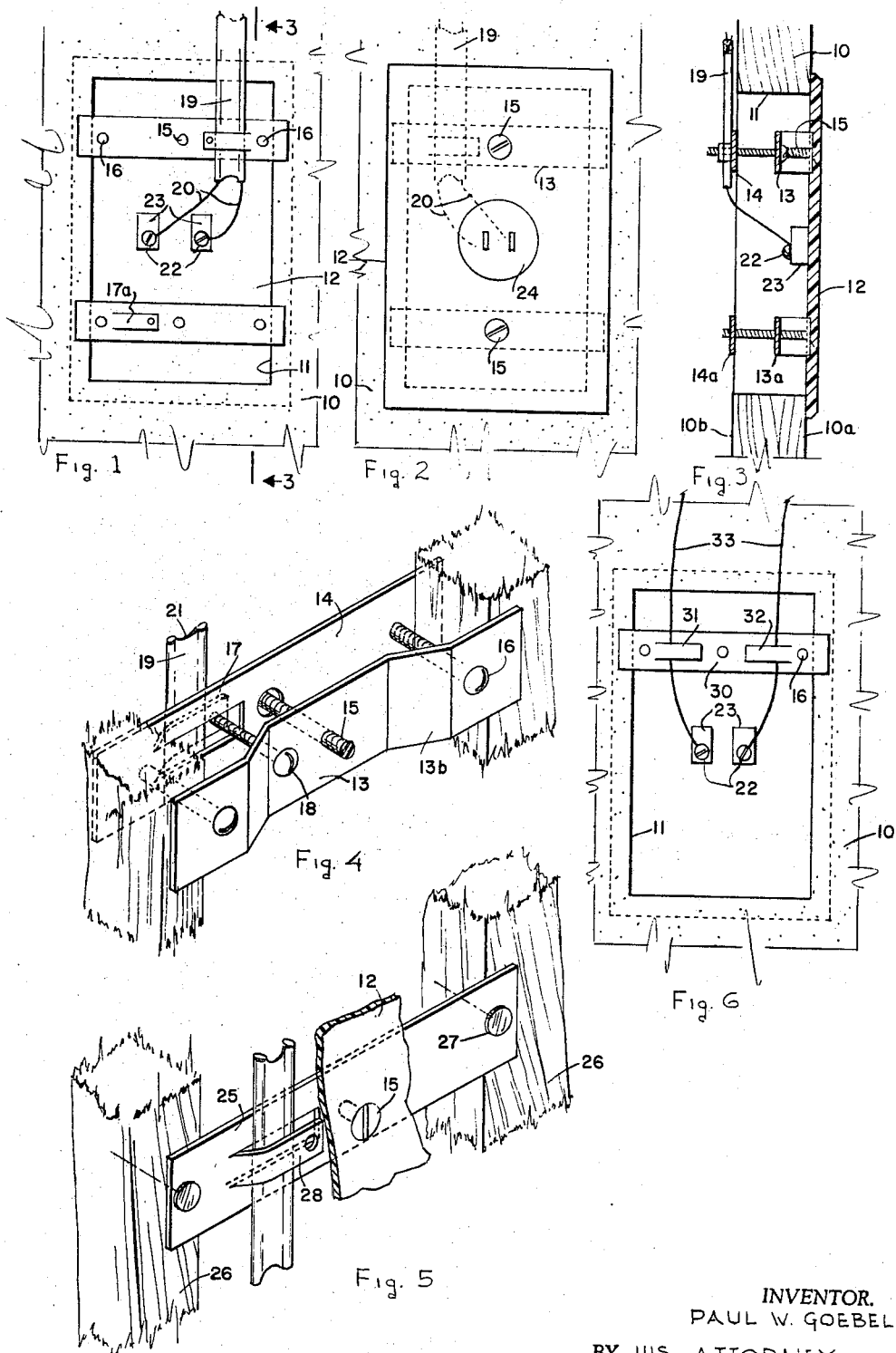

3,418,421
WALL PLATE ASSEMBLY HAVING
IMPROVED ATTACHING MEANS
Paul W. Goebel, Westlake, Ohio
(1095 Chatham Place, Rocky River, Ohio 44116)
Filed Dec. 22, 1965, Ser. No. 515,565
3 Claims. (Cl. 174—57)

ABSTRACT OF THE DISCLOSURE

A wall plate assembly for making an electrical connection between a conductor and a device to be energized thereby, including a plate member, having electrical terminal means to effect the electrical connection, adapted to be mounted about an opening in a wall or the like having opposed sides. At least one pair of cooperating strips is used to secure the plate member with respect to the wall, one strip of each pair being secured to the plate member and making an adjustable connection with its companion strip. One of the strips has attaching means to receive a conductor and fix it relatively to the plate member.

---

The practice of running electrical leads or wires behind a wall of a room to a suitable outlet is well established. Many electrically operated devices, particularly such home appliances as lamps, fans, radios, television sets, refrigerators, etc., are then detachably connected to the outlet as by a standard two-prong plug.

In making installations of this type, a workman often finds it difficult to reach the small, cramped confines behind the wall of which an electrical outlet is to be placed. One associated problem is to provide a sufficient length of electrical leads, wires, conductors, and the like, so as to reach the outlet area on the wall from a remote point of entry, such as an attic or another room. In order to be sure that enough length of a conductor is provided to reach the outlet, a workman often errs on the side of providing too much by stuffing an excessive length of the conductor into or between walls at the remote point of entry mentioned. As a result, upon completing the wire installation at the electrical outlet being formed, the workman must either cut off the excessive length, resulting in waste; or he must fold or loop the excessive conductor back on itself, stuffing it behind the wall and thereby creating an unsafe, hazardous condition.

In some junction box installations, which present different installation problems as compared to a wall or face plate, it has been suggested to clamp a metallic tubing or armor, which houses ordinary insulated wires or conductors, to the junction box. Such tubing is usually referred to as "conduit." However, this type of installation does not solve the previously indicated problems, since the metallic tubing is not secured with respect to the wires it carries. Thus, to the contrary, the wires are quite free to move longitudinally of the tubing, so that the problems of wire installation, to which the present invention is addressed, still remain.

In contrast to the foregoing, the present plate structure includes securing means which not only fixes the plate relatively to a support such as the wall, but also serves by direct contact with the wires or conductors to anchor them with respect to the wall plate as well. The point of anchoring is spaced from the free ends of the wires, thereby permitting easy electrical connection of the free ends as to an electrical terminal or post.

It is, therefore, a principal object of the present invention to provide an improved wall or face plate designed to effect an electrical connection between a conductor and a device to be energized thereby.

Another object is to provide a wall plate which during installation avoids excessive use and waste of a conductor.

A further object is to provide a wall plate having means which secures the plate relatively to a wall and also receives and secures lead-in conductors and the like relatively to the plate.

Additional objects and advantages will be apparent from the following description and drawings, wherein:

FIGURE 1 is a fragmentary, rear, elevational view of a plate of the present invention installed adjacent an opening in a wall and connected to a lead-in television cable;

FIGURE 2 is a fragmentary, front elevational view of FIGURE 1;

FIGURE 3 is a section of FIGURE 1 on the line 3—3;

FIGURE 4 is an enlarged, isometric view of one of the pairs of clamping bars of FIGURE 1;

FIGURE 5 is an isometric view similar to FIGURE 4 and shows a modified use of only one bar or strip; and FIGURE 6 is a fragmentary, rear elevational view similar to FIGURE 1 and illustrating further modifications of the present invention.

Referring to the drawings and particularly to the embodiment of FIGURES 1 through 4, a wall 10 having opposed sides 10a and 10b is provided with an opening 11 over which a plate structure of the present invention is mounted. A rectangular plate 12, somewhat oversized with respect to the opening 11, fits against side 10a of the wall and covers the opening as shown in FIGURE 1. The plate 10 may be made of plastic, metal, or the like.

Securing means mounts the plate 12 relatively to the wall 10 and receives conductors in such a manner as to fix them relatively to the plate as well. In the embodiment of FIGURES 1 through 4, a pair of cooperating strips or bars 13 and 14 defines such securing means. Strip 13 is placed immediately behind the plate 12. A bolt 15 (FIGURE 2) passes through aligned threaded openings in the plate 12 and strip 13 to join these parts together. If the wall 10 is of relatively small thickness, the bolt 15 may pass as well through a threaded opening in the strip 14. Strip 14 is adjustably secured to strip 13 for movement toward and away therefrom. In the embodiment illustrated, this is accomplished by two bolts 16 which engage aligned threaded openings in the strips 13 and 14 (FIGURE 4). This structure enables the strips 13 and 14 to engage the opposed sides 10a and 10b of the wall 10 and hold the plate 12 relatively thereto. Strip 13 preferably is offset at two sections as at 13b in a direction away from the plate 12 to rigidify the clamp structure and, further, to provide room behind the plate for other fittings. Also, because of the adjustability of the strip 14 with respect to strip 13, the plate 12 can be so mounted against walls of varying thickness. The strips 13 and 14 may be composed of metal, plastic, or the like.

In order to receive conductors in such a manner as to fix them relatively to the plate 12, the securing means as defined by the strips 13 and 14 has gripping means to engage tightly an electrical conductor. In the form illustrated, strip 14 has a finger 17 preferably struck therefrom, behind which a conductor is caught and held as illustrated. Normally, the natural resiliency of the finger portion 17 is sufficient to grip the conductor, but if desired a bolt 18 may be used to force the finger positively to bear against the conductor and thereby press it against the strip 14. For example, the bolt 18 may pass through a threaded hole in strip 13 to bear against the finger 17; or as in the embodiment of FIGURE 4 the finger 17 may also have a threaded opening to receive the bolt 18 which pulls the finger toward the viewer thereby securing a conductor against the remote side of strip 14.

Any suitable conductor may be used with the plate member of the present invention. In the form illustrated by FIGURES 1 through 4, a television cable 19 is shown caught between the finger 17 and strip 14. The cable comprises two conductors 20 insulated and held in spaced apart relation by a connecting non-conducting plastic web 21. The ends of the conductors 20 are bared to connect in the usual manner around metal bolts 22. Each bolt 22 makes electrical connection with a metal blade 23 extending through the plate 12 to form a plug-in socket 24 (FIGURE 2) of standard construction and use.

Although one set of strips or clamps 13 and 14 is needed to mount a plate 12 with respect to a wall 10, as shown in FIGURE 1, a second set 13a and 14a which may be of identical construction, can also be used. The two sets are positioned adjacent opposite ends of the plate member 12 as illustrated by FIGURE 1. Strip 13a also has gripping finger means 17a to grip a conductor. Multiple gripping means on two sets of clamps can be used, for example, when the terminal means comprises a multiple outlet, as when more than one electrical device is to be energized at the same time through a connection afforded by the plate member 12.

FIGURES 5 and 6 show other modifications possible with the present invention. FIGURE 5 illustrates that the securing means can comprise only one strip or bar and that the strip (and therefore the plate) need not be secured adjacent an opening in a wall. More particularly, in FIGURE 5 a single strip 25 is attached adjacent its ends to vertically disposed, spaced apart furring strips 26 by any suitable fastener 27. Strip 25 has finger means 28 to grip a television cable 19 or the like as before. As in the case of finger means 17, the finger means 28 may constitute an added member attached as by welding to the strip 25, or the finger means may be stamped or otherwise formed directly from the strip itself. Strip 25 has a central opening, preferably threaded, to receive a fastener such as the bolt 15 to secure the strip 25 to a platelike member 12.

FIGURE 6 illustrates that the same strip may have a plurality of finger means to receive and secure a plurality of conductors not physically connected to each other like the conductors 20 of the television cable 19. In this case, the plate 12 covers an opening 11 in a wall 10 as before and has a single pair of strips, of which only the outermost strip 30 is shown in FIGURE 6. Strip 30 and its companion strip are of the same structure as strips 13 and 14 and are also joined to the plate 12 and to the wall 10 as in the manner shown by FIGURES 1 through 4. However strip 30 has two finger gripping means 31 and 32, each of which receives and frictionally grips a conductor 33. A bared end of each conductor 33 wraps around a bolt 22 making electrical connection with blades 23 terminating in a socket 24 as in FIGURE 2. If desired, just one of the finger means 31 or 32 could receive and grip both of the conductors 33.

In all embodiments, it will be noted that the finger means, such as that illustrated at 17, does not grip a metallic tube or armor or "conduit" which normally encases electrical leads. Instead, the contact by the gripping means is made directly with the conductors 20 or 33 so as truly to fix them relatively to the backing strips and plate. To prevent short circuiting, the conductors are usually insulated, but this insulation is integral with the wires or like conductors. Consequently, gripping such insulation effectively grips the conductors themselves.

While the foregoing description is primarily directed to the installation of a television cable with the present wall plate, it will be apparent that all types of electrical installations are contemplated wherein a detachable connection is effected by means of the wall or face plate, including for example: telephone jacks, television and radio speakers, a conventional 120 volt A.C. outlet for electrically operated home appliances, and the like. Any type of fastener may be used where needed in the present structure, including bolts, screws, rivets, and the like. The openings where indicated for bolts or screws, etc., can if desired be self-tapping. Otherwise, standard nuts including speed nuts can be used with the bolts. All of the modifications shown can be selectively used, that is, any one can be used alone or in combination with any of the other modifications.

It will be apparent that the present invention provides an improved wall or face plate designed to effect an electrical connection between an electrical conductor and an electrical device to be energized thereby. Not only does the described securing means fill a dual role of securing a plate to a wall and conductors to the plate, but the present structure permits a conductor to be cut to size with little or no waste. After the conductor is introduced at some remote point and fed to the present wall plate, the conductor can then be secured as to the present strips or bars. The conductor can now be pulled "tight" at its other extremity, that is, at the remote point. The present securing or gripping means permits a conductor to hang freely in a normally generally vertical position for easy subsequent connection at its free end as to a terminal connection. Even after such connection of a conductor, the securing means appreciably relieves the strain of the physical connection of the conductor to the terminal connection of the plate.

Although the foregoing describes a preferred form of the invention and several modifications thereof, it is understood that the invention may be practiced in still other forms within the scope of the following claims.

I claim:
1. A wall plate assembly for making an electrical connection between a conductor and a device to be energized thereby, comprising in combination: a plate member having electrical terminal means to effect said electrical connection adapted to be mounted about an opening in a wall or the like having opposed sides, at least one pair of cooperating strips for securing the plate member with respect to said wall, said pair of cooperating strips being positioned adjacent an end of the plate member, one strip of said pair being secured to the plate member and making an adjustable connection with its companion strip, and one of said strips having attaching means to receive a conductor and fix it relatively to said plate member.

2. The wall plate assembly of claim 1, wherein said one strip is secured to a back side of said plate member, the second strip of said pair being adjustably secured to the first strip for movement toward and away therefrom to engage therebetween the opposed sides of said wall, said second strip having gripping means effective to engage tightly an electrical conductor at a portion thereof having electrical insulation but being free of encasing conduit that is relatively movable longitudinally of the conductor, thereby to fix the conductor relatively to the plate member and provide a sufficient length of the conductor for connection without waste to the electrical terminal means of the plate member.

3. The wall plate assembly of claim 2 wherein the adjustable movement of said second strip toward and away from the first strip enables mounting of the plate member with respect to walls of variable thickness, and the engagement of the gripping means with the electrical conductors relieves the strain of the connection of the conductors with said terminal means of the plate member.

References Cited

UNITED STATES PATENTS

| | | | |
|---|---|---|---|
| 1,839,250 | 1/1932 | Newman et al. | 174—61 |
| 2,140,771 | 12/1938 | Slayter et al. | 174—48 |
| 2,531,698 | 11/1950 | Petrick et al. | |
| 2,684,994 | 7/1954 | Kwake | 174—65 X |
| 2,771,501 | 11/1956 | Despard | 174—53 |

LARAMIE E. ASKIN, *Primary Examiner.*

U.S. Cl. X.R.

174—48.